(12) United States Patent
Kress (10) Patent No.: US 11,590,811 B2
(45) Date of Patent: Feb. 28, 2023

(54) VALVE STEM SUPPORT APPARATUS

(71) Applicant: Richard Kress, Aurora, CO (US)

(72) Inventor: Richard Kress, Aurora, CO (US)

( * ) Notice: Subject to any disclaimer, the term of this patent is extended or adjusted under 35 U.S.C. 154(b) by 56 days.

(21) Appl. No.: 17/225,431

(22) Filed: Apr. 8, 2021

(65) Prior Publication Data

US 2022/0324274 A1 Oct. 13, 2022

(51) Int. Cl.
*B60C 29/06* (2006.01)
*B60C 29/02* (2006.01)

(52) U.S. Cl.
CPC ............ *B60C 29/06* (2013.01); *B60C 29/02* (2013.01)

(58) Field of Classification Search
CPC .............................. Y10S 152/13; B60C 29/06
USPC ................. 248/222.14, 230.6, 229.1, 229.25
See application file for complete search history.

(56) References Cited

U.S. PATENT DOCUMENTS

| | | | |
|---|---|---|---|
| D27,067 S | 5/1897 | Pyle | |
| 1,331,347 A * | 2/1920 | McNamara | B60C 29/066 152/428 |
| 1,704,286 A * | 3/1929 | Franklin, Jr. | B60C 29/06 138/89.2 |
| 2,101,317 A * | 12/1937 | Lemieux | E04G 7/16 403/53 |
| 2,311,748 A | 2/1943 | Gora | |
| 2,334,801 A * | 11/1943 | Zimmerman | B60C 29/06 81/487 |
| 2,580,343 A | 12/1951 | Benoit | |
| 2,631,065 A * | 3/1953 | Borodie | B60C 29/06 152/DIG. 13 |
| 2,968,206 A | 1/1961 | Omoto | |
| 3,018,815 A * | 1/1962 | Robb | B60C 29/06 152/DIG. 13 |
| 3,039,510 A * | 6/1962 | Cardi | B60C 29/06 152/DIG. 13 |
| 3,064,705 A * | 11/1962 | Brown | B60C 29/06 152/DIG. 13 |
| 3,077,220 A * | 2/1963 | Fusco, Jr. | B60C 29/06 152/DIG. 13 |
| 3,939,894 A | 2/1976 | Curtis | |
| 3,973,614 A * | 8/1976 | Taylor | B60C 29/06 152/427 |
| 4,043,373 A | 8/1977 | Durham | |
| 4,356,836 A * | 11/1982 | Wenger | F16K 27/08 137/232 |

(Continued)

FOREIGN PATENT DOCUMENTS

| | | | |
|---|---|---|---|
| CN | 107956899 A * | 4/2018 | ............. F16K 27/08 |
| WO | WO-2019200449 A1 * | 10/2019 | |

*Primary Examiner* — Robert K Arundale (57) ABSTRACT

A valve stem support apparatus for supporting a valve stem while attached to a pump includes a bracket having a bracket top side, a bracket right side and a bracket left side. The bracket top side has a valve aperture extending therethrough. The valve aperture slidingly receives a valve stem of a tire of a bicycle. Each of the bracket left side and the bracket right side has a screw aperture extending therethrough. A receiving distance between the bracket right side and the bracket left side is wider than a rim of the bicycle. A pair of thumb screws is coupled to the bracket. The pair of thumb screws is threadingly engaged with the screw apertures of the bracket left side and the bracket right side to engage the rim of the bicycle and secure the bracket.

10 Claims, 6 Drawing Sheets

(56) References Cited

U.S. PATENT DOCUMENTS

| | | | | |
|---|---|---|---|---|
| 5,163,652 | A | * | 11/1992 | King ................... A01K 97/10 |
| | | | | 248/231.61 |
| 5,195,561 | A | * | 3/1993 | Wilson ................ B60C 29/066 |
| | | | | 301/5.24 |
| 6,481,204 | B1 | * | 11/2002 | Yuschak ............... B25B 5/065 |
| | | | | 60/527 |
| 6,802,569 | B1 | * | 10/2004 | Conard ................ B60C 29/06 |
| | | | | 248/65 |
| 6,898,893 | B1 | * | 5/2005 | Mukdaprakorn ...... A01K 97/10 |
| | | | | 248/538 |
| 7,093,632 | B1 | | 8/2006 | Falkenburg |
| 7,731,138 | B2 | * | 6/2010 | Wiesner ............. A61M 5/1415 |
| | | | | 248/231.71 |

* cited by examiner

VALVE STEM SUPPORT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tire valve devices and more particularly pertains to a new tire valve device for supporting a valve stem while attached to a pump. The present device includes a bracket that is engageable with a wheel of a bicycle. The bracket includes a pair of support screws as well as an adjustment plate.

(2) Description of Related Art Including Information Disclosed Under 37 CFR 1.97 and 1.98

The prior art relates to tire valve devices. Known devices are integrated into the wheel or tire of the bicycle. These devices are not easily engaged or disengaged specifically for use with a pump. Existing devices also lack an adjustment plate for use with different valves.

BRIEF SUMMARY OF THE INVENTION

An embodiment of the disclosure meets the needs presented above by generally comprising a bracket having a bracket top side, a bracket right side and a bracket left side. The bracket top side has a valve aperture extending therethrough. The valve aperture is configured to slidingly receive a valve stem of a tire of a bicycle. Each of the bracket left side and the bracket right side has a screw aperture extending therethrough. A receiving distance between the bracket right side and the bracket left side is configured to be wider than a rim of the bicycle. A pair of thumb screws is coupled to the bracket. The pair of thumb screws is threadingly engaged with the screw apertures of the bracket left side and the bracket right side to engage the rim of the bicycle and secure the bracket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new tire valve device embodying the principles and concepts of an embodiment of the disclosure and generally designated by the reference numeral 10 will be described.

As best illustrated in FIGS. 1 through 7, the valve stem support apparatus 10 generally comprises a bracket 12 having a bracket top side 14, a bracket right side 16 and a bracket left side 18. The bracket top side 14 and the bracket left side 18 and the bracket top side 14 and the bracket right side 16 may form rounded 90° bends. The bracket top side 14 has a valve aperture 20 extending therethrough. The valve aperture 20 is configured to slidingly receive a valve stem 22 of a tire 24 of a bicycle 26.

Each of the bracket left side 18 and the bracket right side 16 has a screw aperture 28 extending therethrough. A receiving distance 30 between the bracket right side 16 and the bracket left side 18 is configured to be wider than a rim 32 of the bicycle.

An adjuster plate 34 has an adjustment aperture 36 extending therethrough. The adjustment aperture 36 is smaller than the valve aperture 20 and is configured to receive a thinner valve stem such as a Presta valve. The adjuster plate 34 may be square.

A pair of thumb screws 38 is coupled to the bracket 12. The pair of thumb screws 38 is threadingly engaged with the screw apertures 28 of the bracket left side and the bracket right side to engage the rim 32 of the bicycle and secure the bracket 12. Each of the thumb screws 38 may have a grip portion 40 and a threaded shaft portion 42. Each grip portion 40 may be a truncated elliptical shape dimensioned to be easily held between the user's thumb and forefinger.

A pair of tips 44 may be coupled to the pair of thumb screws 38. Each tip 44 may have a hemispherical portion 46 and a collar portion 48. The collar portion 48 is coupled to the shaft portion 42 of the respective thumb screw 38. Each tip 44 may be rubberized and is configured to prevent damage to the rim 32 of the bicycle.

Figure 1:
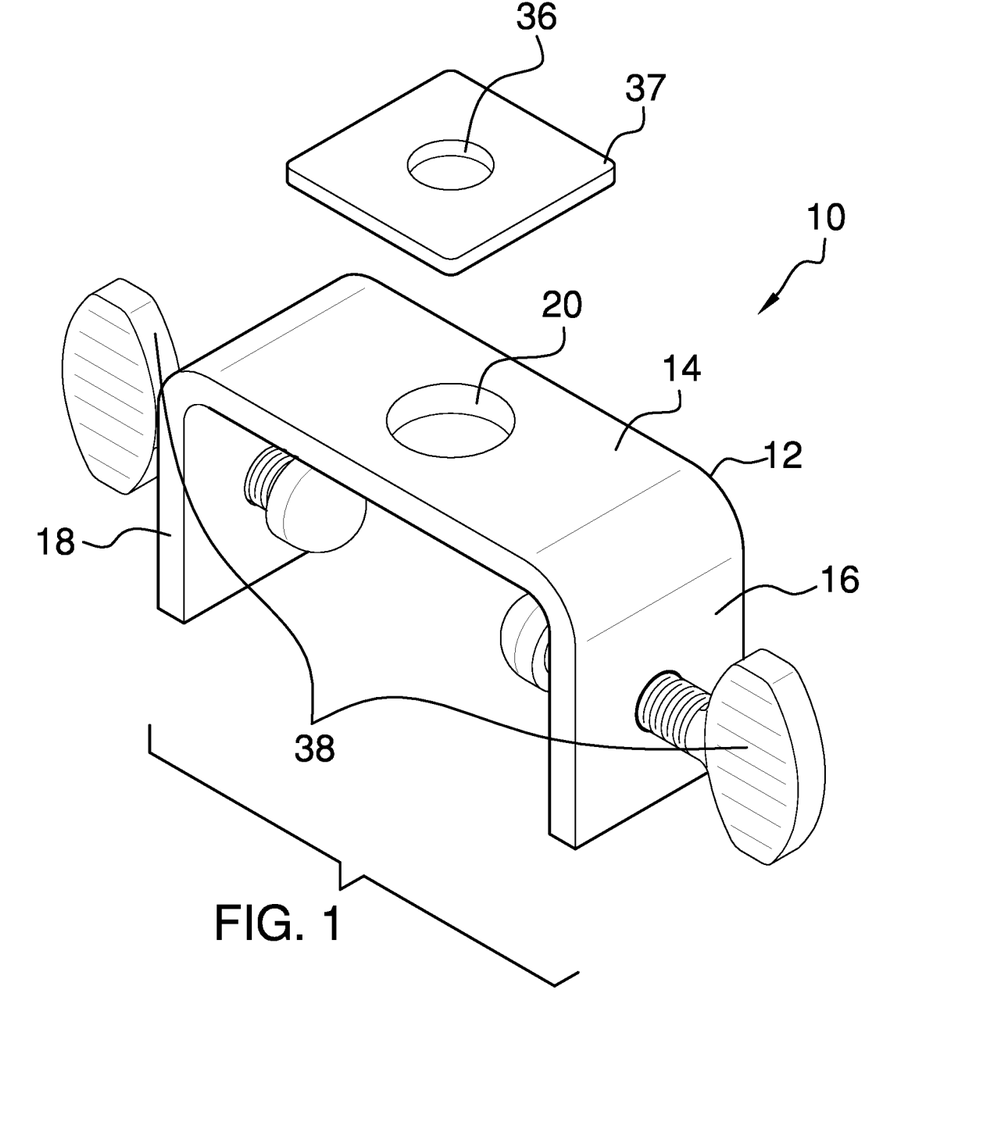
FIG. 1 is an isometric view of a valve stem support apparatus according to an embodiment of the disclosure.
Figure 2:
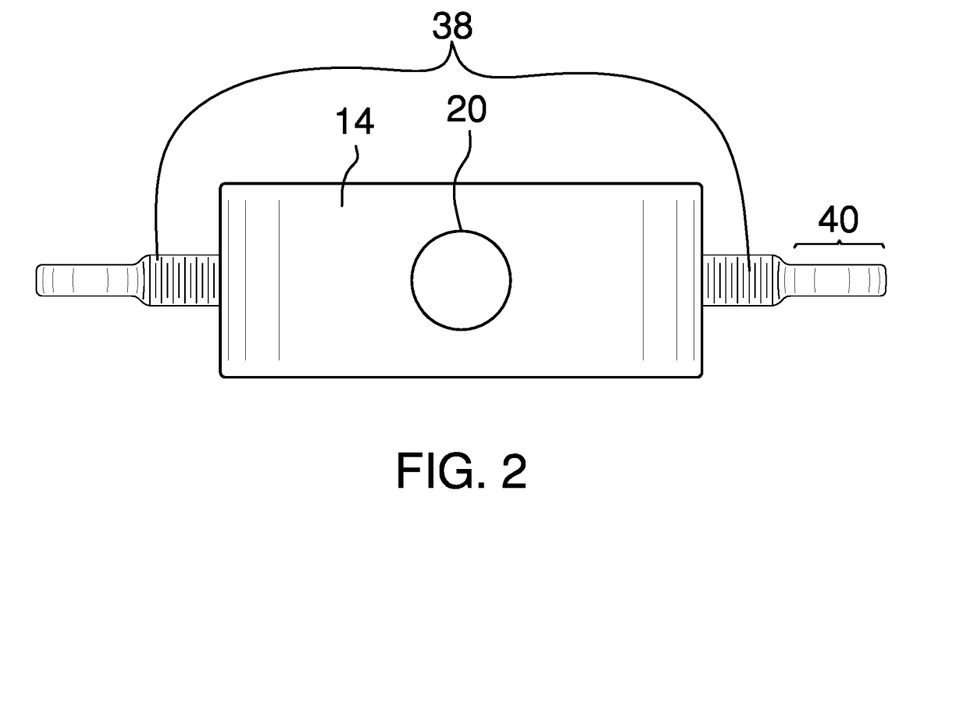
FIG. 2 is a top plan view of an embodiment of the disclosure.
Figure 3:
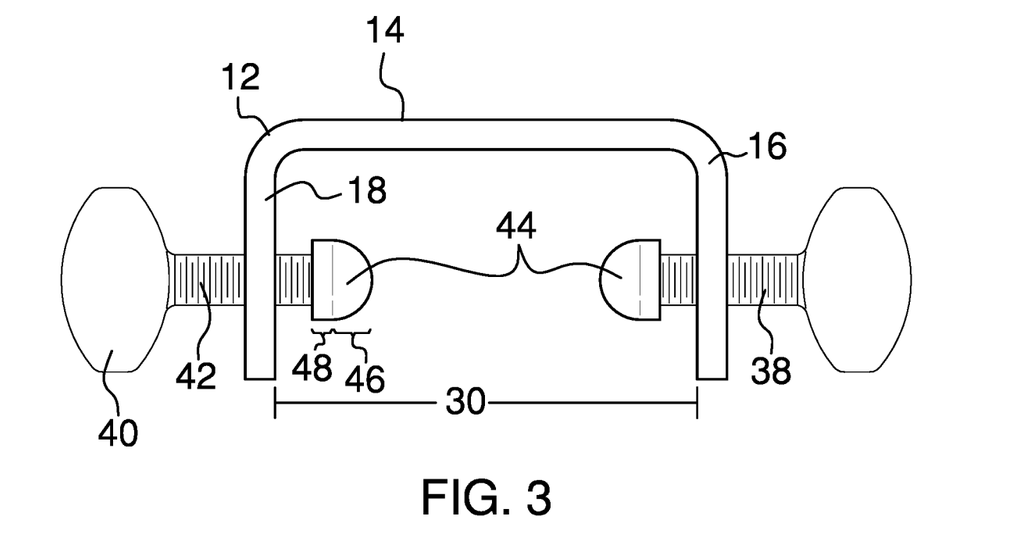
FIG. 3 is a front elevation view of an embodiment of the disclosure.
Figure 4:
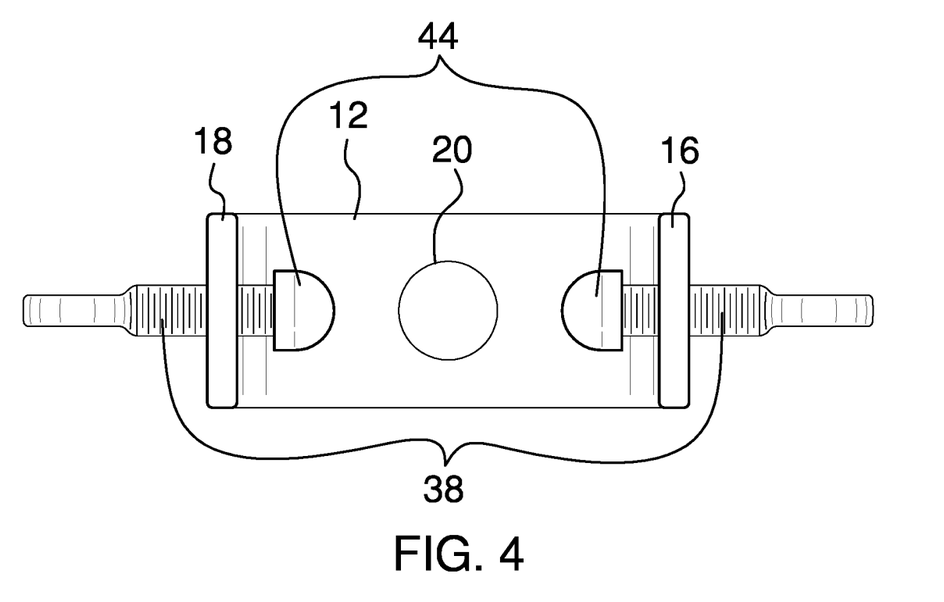
FIG. 4 is a bottom plan view of an embodiment of the disclosure.
Figure 5:
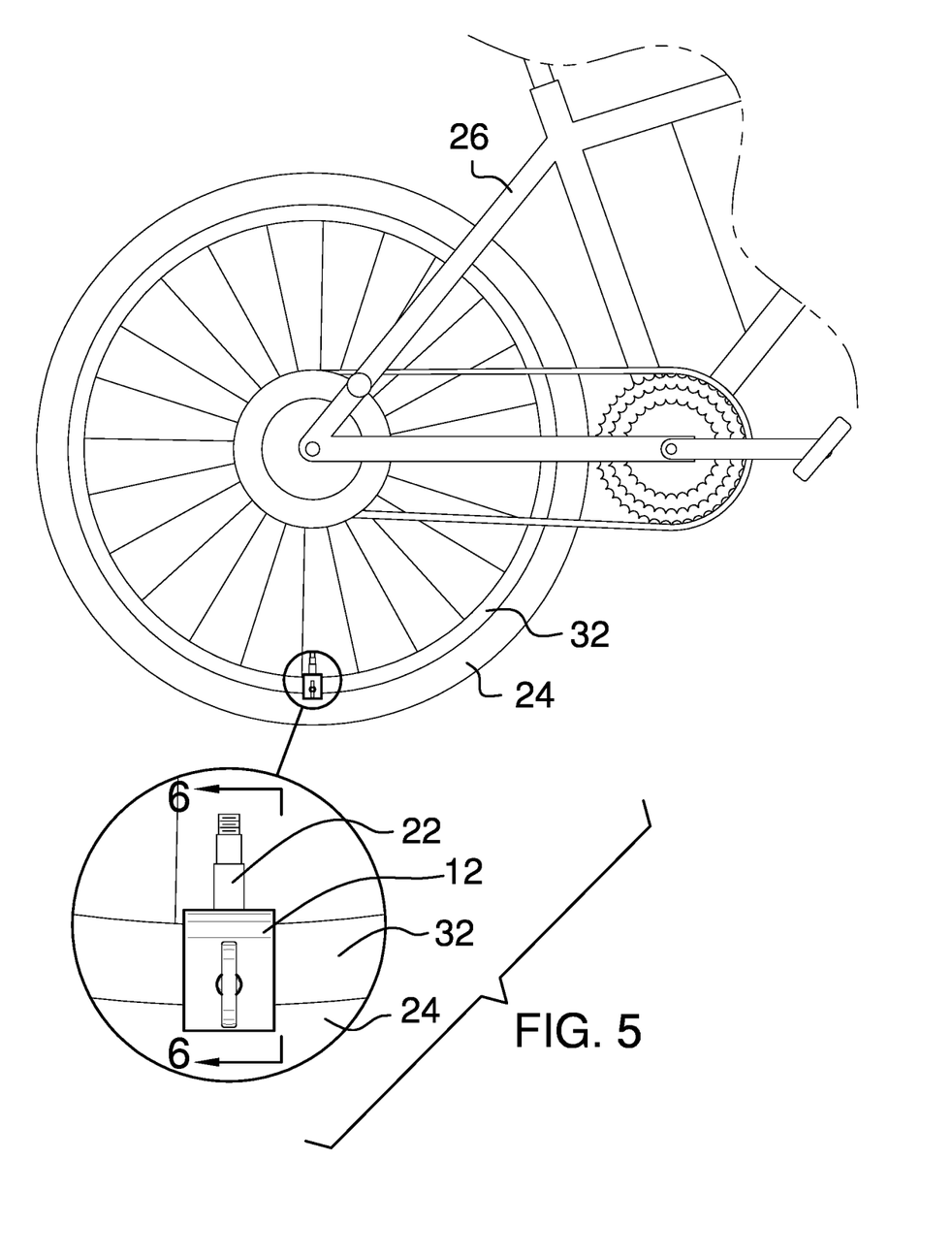
FIG. 5 is an in-use view of an embodiment of the disclosure.
Figure 6:
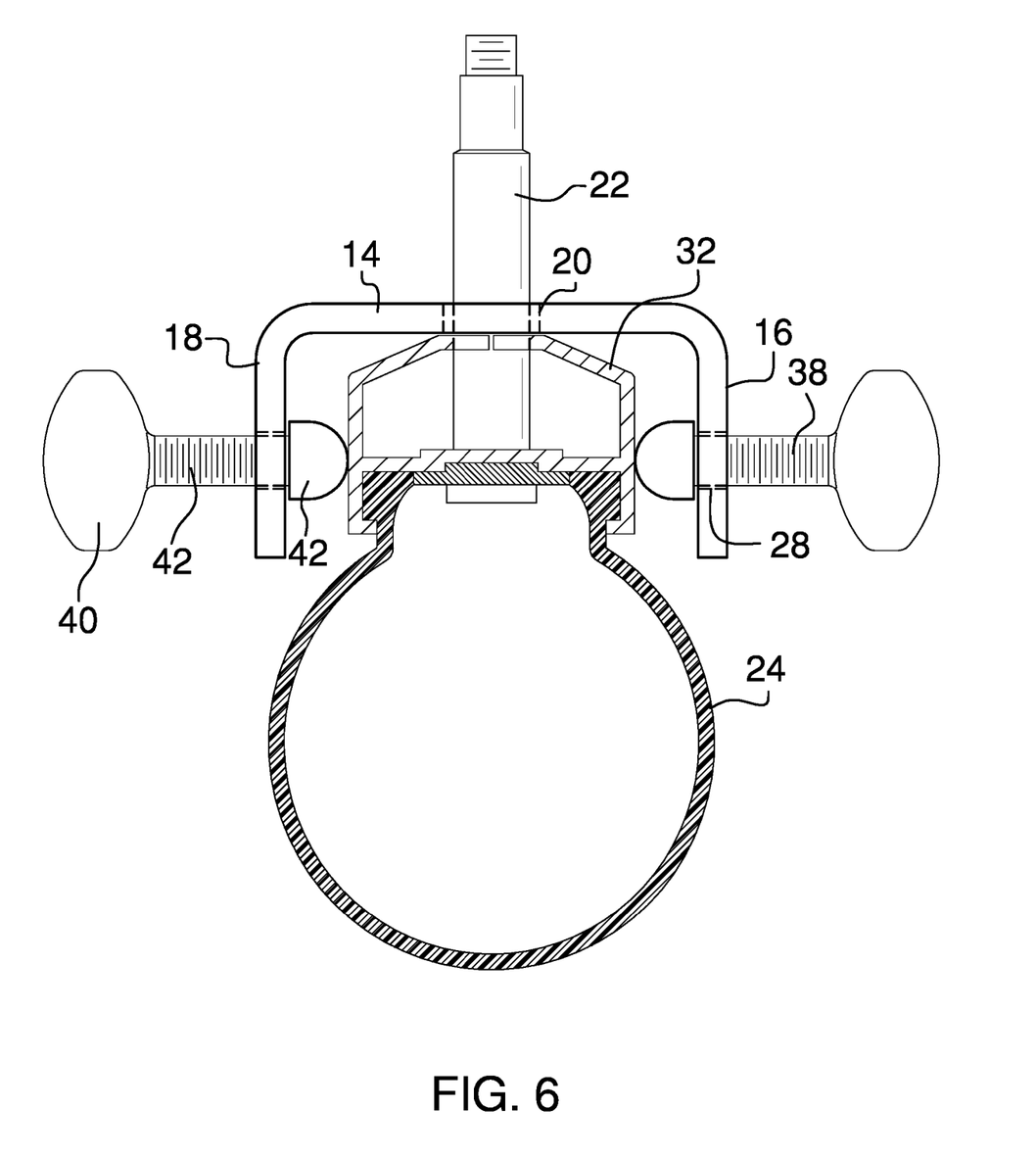
FIG. 6 is a cross-sectional view of an embodiment of the disclosure along the line 6-6 of FIG. 5.
Figure 7:
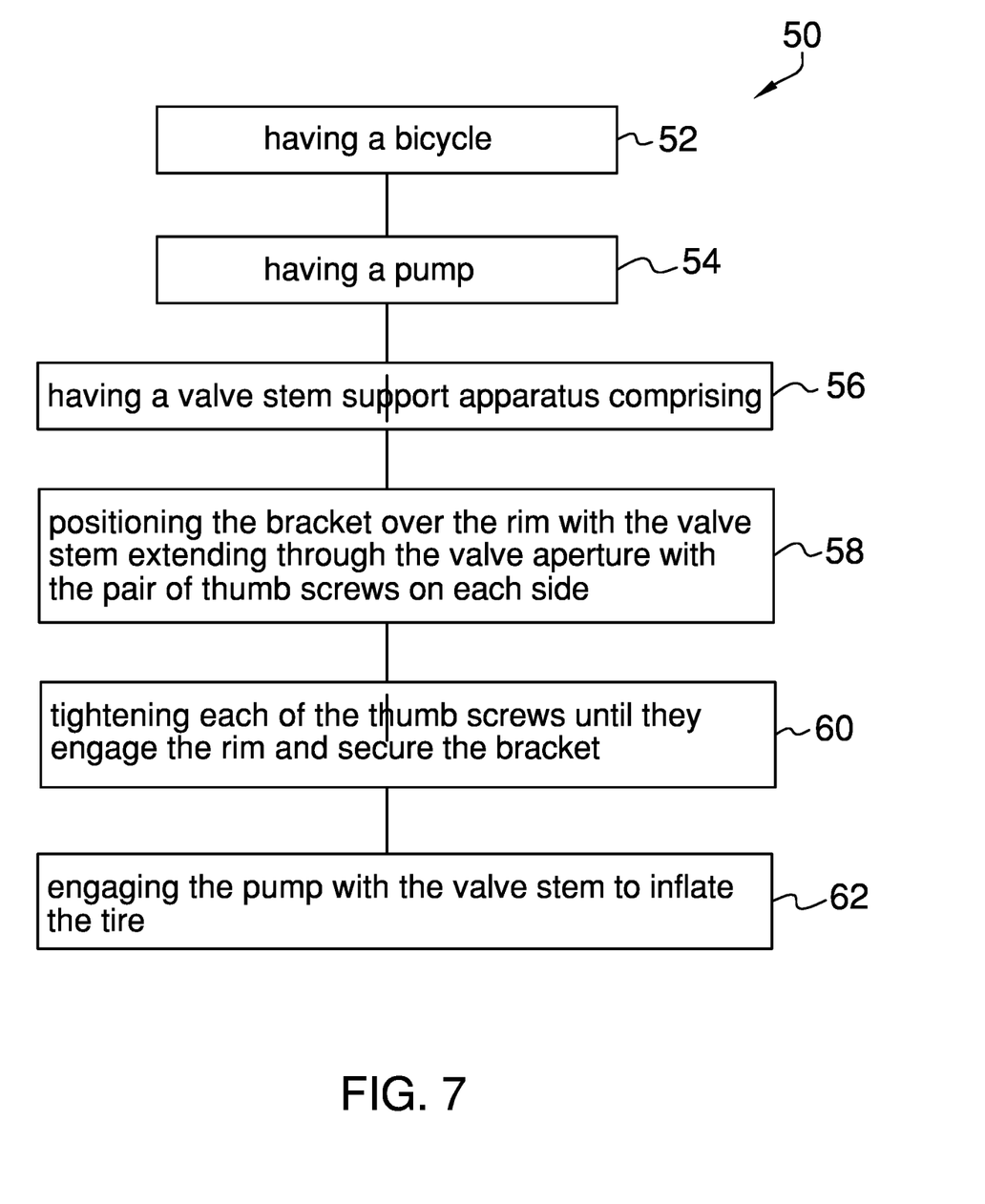
FIG. 7 is a schematic of an embodiment of the disclosure.

In use, the valve stem support apparatus 10 allows for a method of use 50 comprising a step 52 comprising having the bicycle 26. A step 54 comprises having a pump. A step 56 comprises having the valve stem support apparatus 10. A step 58 comprises positioning the bracket 12 over the rim 32 with the valve stem 22 extending through the valve aperture 20 with the pair of thumb screws 38 on each side. A step 60 comprises tightening each of the thumb screws 38 until they engage the rim 32 and secure the bracket 12. A step 62 comprises engaging the pump with the valve stem 22 to inflate the tire 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A valve stem support apparatus comprising:
   a bracket having a bracket top side, a bracket right side and a bracket left side, the bracket top side having a valve aperture extending therethrough, the valve aperture being configured to slidingly receive a valve stem of a tire of a bicycle, each of the bracket left side and the bracket right side having a screw aperture extending therethrough, a receiving distance between the bracket right side and the bracket left side being configured to be wider than a rim of the bicycle; and
   a pair of thumb screws coupled to the bracket, the pair of thumb screws being threadingly engaged with the screw apertures of the bracket left side and the bracket right side to engage the rim of the bicycle and secure the bracket.

2. The valve stem support apparatus of claim 1 further comprising each of the thumb screws having a grip portion and a threaded shall portion.

3. The valve stem support apparatus of claim 1 further comprising each grip portion being a truncated elliptical shape.

4. The valve stem support apparatus of claim 1 further comprising a pair of tips coupled to the pair of thumb screws, each tip being configured to prevent damage to the rim of the bicycle.

5. The valve stem support apparatus of claim 4 further comprising each tip having a hemispherical portion and a collar portion.

6. The valve stem support apparatus of claim 1 further comprising the bracket top side and the bracket left side and the bracket top side and the bracket right side forming rounded 90° bends.

7. The valve stem support apparatus of claim 1 further comprising an adjuster plate having an adjustment aperture extending therethrough, the adjustment aperture being smaller than the valve aperture and configured to receive a thinner valve stem.

8. The valve stem support apparatus of claim 1 further comprising the adjuster plate being square.

9. A valve stem support apparatus comprising:
   a bracket having a bracket top side, a bracket right side and a bracket left side, the bracket top side and the bracket left side and the bracket top side and the bracket right side forming rounded 90° bends, the bracket top side having a valve aperture extending therethrough, the valve aperture being configured to slidingly receive a valve stem of a tire of a bicycle, each of the bracket left side and the bracket right side having a screw aperture extending therethrough, a receiving distance between the bracket right side and the bracket left side being configured to be wider than a rim of the bicycle;
   an adjuster plate having an adjustment aperture extending therethrough, the adjustment aperture being smaller than the valve aperture and configured to receive a thinner valve stem, the adjuster plate being square;
   a pair of thumb screws coupled to the bracket, the pair of thumb screws being threadingly engaged with the screw apertures of the bracket left side and the bracket right side to engage the rim of the bicycle and secure the bracket, the thumb screws having a grip portion and a threaded shaft portion, each grip portion being a truncated elliptical shape; and
   a pair of tips coupled to the pair of thumb screws, each tip having a hemispherical portion and a collar portion, each tip being configured to prevent damage to the rim of the bicycle.

10. A method of supporting a tire valve stem during inflation comprising:
    having a bicycle, the bicycle having a pair of wheels with each wheel having a rim and a tire, the tire having a valve stem;
    having a pump;
    having a valve stem support apparatus comprising:
       a bracket having a bracket top side, a bracket right side and a bracket left side, the bracket top side having a valve aperture extending therethrough, the valve aperture being configured to slidingly receive the valve stem of the tire of the bicycle, each of the bracket left side and the bracket right side having a screw aperture extending therethrough, a receiving distance between the bracket right side and the bracket left side being configured to be wider than the rim of the bicycle; and
       a pair of thumb screws coupled to the bracket, the pair of thumb screws being threadingly engaged with the screw apertures of the bracket left side and the bracket right side to engage the rim of the bicycle and secure the bracket;

positioning the bracket over the rim with the valve stem extending through the valve aperture with the pair of thumb screws on each side;
tightening each of the thumb screws until they engage the rim and secure the bracket; and
engaging the pump with the valve stem to inflate the tire.

\* \* \* \* \*